US011699021B1

(12) United States Patent
Ransom (10) Patent No.: US 11,699,021 B1
(45) Date of Patent: Jul. 11, 2023

(54) SYSTEM FOR READING CONTENTS FROM A DOCUMENT

(71) Applicant: Bottomline Technologies Limited, Reading (GB)

(72) Inventor: Mitchell Ransom, Reading (GB)

(73) Assignee: Bottomline Technologies Limited, Reading (GB)

( * ) Notice: Subject to any disclaimer, the term of this patent is extended or adjusted under 35 U.S.C. 154(b) by 0 days.

(21) Appl. No.: 17/693,492

(22) Filed: Mar. 14, 2022

(51) Int. Cl.
  *G06F 17/00* (2019.01)
  *G06F 40/106* (2020.01)
  *G06V 30/414* (2022.01)
  *G06V 30/146* (2022.01)

(52) U.S. Cl.
  CPC .......... *G06F 40/106* (2020.01); *G06V 30/146* (2022.01); *G06V 30/414* (2022.01)

(58) Field of Classification Search
  CPC .... G06F 40/106; G06F 3/04812; G06F 40/10; G06F 40/274; G06V 30/146; G06V 30/414
  USPC ........................................................ 715/234
  See application file for complete search history.

(56) References Cited

U.S. PATENT DOCUMENTS

| 8,660,356 | B2 | 2/2014 | Fisher | |
|---|---|---|---|---|
| 9,367,766 | B2 | 6/2016 | Wang et al. | |
| 10,467,464 | B2 | 11/2019 | Chen et al. | |
| 10,606,933 | B2 | 3/2020 | Breuel et al. | |
| 2003/0014445 | A1* | 1/2003 | Formanek | G06F 40/103 707/E17.121 |
| 2006/0062453 | A1* | 3/2006 | Schacht | G06V 30/1444 382/164 |
| 2009/0254347 | A1* | 10/2009 | Moore | G10L 15/22 704/260 |
| 2017/0262416 | A1* | 9/2017 | Rezgui | G06F 40/146 |

* cited by examiner

*Primary Examiner* — Jason T Edwards
(74) *Attorney, Agent, or Firm* — Richard A Baker, Jr.

(57) ABSTRACT

Disclosed is a system for reading contents from a document. The system includes a memory unit for storing a set of instructions, and a processing unit is coupled to the memory unit for processing the set of instruction. The set of instructions initiates with a step of rendering the document to retrieve the image of each page and retrieving the digital text and location of each word to create digital text blocks for each word. Running OCR on the images retrieved on rendering the document to an OCR location and creating OCR text blocks from the obtained OCR location of each word. Creating an empty array of text blocks, and adding the digital text blocks to the empty array. Adding one OCR text block to the corresponding empty array on confirming the location and performing the looping step on loop till the document is added with the OCR text block into each empty array.

12 Claims, 7 Drawing Sheets

FIG. 4 eINVOICE

Forth Packaging
123 Nickel Street
Los Angeles, CA 90037
USA

| Invoice Number | INV123456 |
|---|---|
| Invoice Date | 01/01/2020 |
| Page | 1 of 2 |
| Purchase Order | USMF-PO-0001234 |
| Payment Terms | Net 30 |
| Due Date | 02/01/2020 |

Receiving
100 Warehouse Road
Redmond, WA 98052
USA — 504

Forth Packaging
Telephone: 452-555-0199
Fax: 476-555-0131
Web: www.forthpackaging.com H J Jaramillo Manufacturing
123 Coffee Street
Suite 300
Redmond, WA 98052
USA

| Item ID | Description | QTY | UOM | Sales Price | Discount | Extended Amount |
|---|---|---|---|---|---|---|
| M0062 | Resin | 10 | lb | $1.15 | | $11.50 |
| A0001 | HDMI 6' Cables | 10 | pcs | $13.80 | | $138.00 |
| D0001 | Mid Range Speaker | 10 | ea | $302.71 | | $3,027.10 |
| D0002 | Cabinet | 10 | ea | $148.42 | | $1,484.20 |
| D0004 | High End Speaker | 30 | ea | $1,068.77 | | $32,063.10 |
| D0005 | Car Audio System | 16 | ea | $228.08 | | $3,649.27 |
| A0002 | HDMI 12' Cables | 12 | pcs | $27.60 | | $331.20 |

502

FIG. 5 eINVOICE

Forth Packaging
123 Nickel Street
Los Angeles, CA 90037
USA

Forth Packaging
Telephone: 462-555-0199
Fax: 476-555-0131
Web: www.forthpackaging.com H.J Jaramillo Manufacturing
123 Coffee Street
Suite 300
Redmond, WA 98052
USA Receiving
100 Warehouse Road
Redmond, WA 98052
USA

| Invoice Number | INV123456 |
| Invoice Date | 01/01/2020 |
| Page | 1 of 2 |
| Purchase Order | USMF-PO-0001234 |
| Payment Terms | Net 30 |
| Due Date | 02/01/2020 |

| ItemID | Description | QTY | UOM | Sales Price | Discount | Extended Amount |
|---|---|---|---|---|---|---|
| M0062 | Resin | 10 | lb | $1.15 | | $11.50 |
| A0001 | HDMI 6 Cables | 10 | pcs | $13.80 | | $138.00 |
| D0001 | Mid Range Speaker | 10 | ea | $302.71 | | $3,027.10 |
| D0002 | Cabinet | 10 | ea | $148.42 | | $1,484.20 |
| D0004 | High End Speaker | 30 | ea | $1,068.77 | | $32,063.10 |
| D0005 | Car Audio System | 16 | ea | $228.08 | | $3,649.27 |
| A0002 | HDMI 12' Cables | 12 | pcs | $27.60 | | $331.20 |

SYSTEM FOR READING CONTENTS FROM A DOCUMENT

BACKGROUND OF THE INVENTION

1. Field of the Invention

The present invention generally relates to a system for reading the text from a document, and more particularly relates to a system for reading content from a document having a combination of an image and a digital text.

2. Description of Related Art

Page description languages, such as the portable document format (PDF) standard, define a set of elements which can be used individually or in combination to compose the pages of a document. These include text elements, raster graphics, and vector graphics, among others.

A raster graphic, called an Image X object in PDF terminology, is represented by a dictionary describing properties of an image with an associated data stream, which contains the image data. Vector graphics, sometimes referred to as vectorial instructions, are based on mathematical equations, and include points, lines, curves, and regular shapes.

An image, or rather, what a human reader considers as one image, can be composed of a combination of these elements. A simple case is when one image is composed of one raster element in the PDF. In some cases, several raster images can be used to build "one" image. Vector graphics are also used, alone or with text elements, but also in combination with raster graphics.

Existing systems for rendering page-image versions of documents on display screens have required manual activities to improve the rendering, or clumsy panning mechanisms to view direct display of page images on wrong-sized surfaces. In particular, it has been necessary to either (1) key in the entire text manually, or (2) process the page images through an optical character recognition (OCR) system and then manually tag the resulting text in order to preserve visually important layout features.

It would be advantageous to have a document analysis system which could process such files and regroup the different elements of the document. Therefore, there is a need of a system that accurately reads the text from the document having a combination of an image and a digital text.

SUMMARY OF THE INVENTION

In accordance with teachings of the present invention, a system for reading the text from a document is provided.

An object of the present invention is to provide a system with a memory unit for storing a set of instructions, and a processing unit is coupled to the memory unit for processing the set of instruction. The set of instructions initiates with a step of rendering the document to retrieve the image of each page of the document, followed by a step of retrieving the digital text and location of each word from each page to create digital text blocks for each word.

Further, the instructions include a step of running OCR on the images retrieved on rendering the document to an OCR location of each word from each page, followed by a step of creating OCR text blocks from the obtained OCR location of each word from each page, further followed by a step of creating an empty array of text blocks for each page, further followed by a step of adding the digital text blocks to the empty array of each page.

Further, the set of instructions include a step of looping through the OCR text blocks for each page, wherein the looping having a steps of: normalizing the location of OCR text blocks, followed by a step of confirming the location of the OCR text blocks does not intersect with the location of digital text blocks; and adding the single OCR text block to the corresponding empty array on confirming the location. Further, the set of instructions include concluding step of performing the looping step on loop till the document is added with the OCR text block into each empty array.

Another object of the present invention is to provide the set of instructions with a step of weighing the text blocks. Further, the OCR text and the digital text are highlighted with a background color on retrieving the document.

Another object of the present invention is to provide the set of instructions wherein the looping including the steps of normalizing the location of digital text blocks, followed by a step of confirming the location of the digital text blocks intersecting with the location of OCR text blocks, followed by a step of replacing the single OCR text block with the digital text block.

While a number of features are described herein with respect to embodiments of the inventions; features described with respect to a given embodiment also may be employed in connection with other embodiments. The following description and the annexed drawings set forth certain illustrative embodiments of the inventions. These embodiments are indicative, however, of but a few of the various ways in which the principles of the inventions may be employed. Other objects, advantages, and novel features according to aspects of the inventions will become apparent from the following detailed description when considered in conjunction with the drawings.

BRIEF DESCRIPTION OF DRAWINGS

The annexed drawings, which are not necessarily to scale, show various aspects of the inventions in which similar reference numerals are used to indicate the same or similar parts in the various views.

DETAILED DESCRIPTION OF DRAWINGS

The present disclosure is now described in detail with reference to the drawings. In the drawings, each element with a reference number is similar to other elements with the same reference number independent of any letter designation following the reference number. In the text, a reference number with a specific letter designation following the reference number refers to the specific element with the number and letter designation and a reference number without a specific letter designation refers to all elements with the same reference number independent of any letter designation following the reference number in the drawings.

Figure 1:
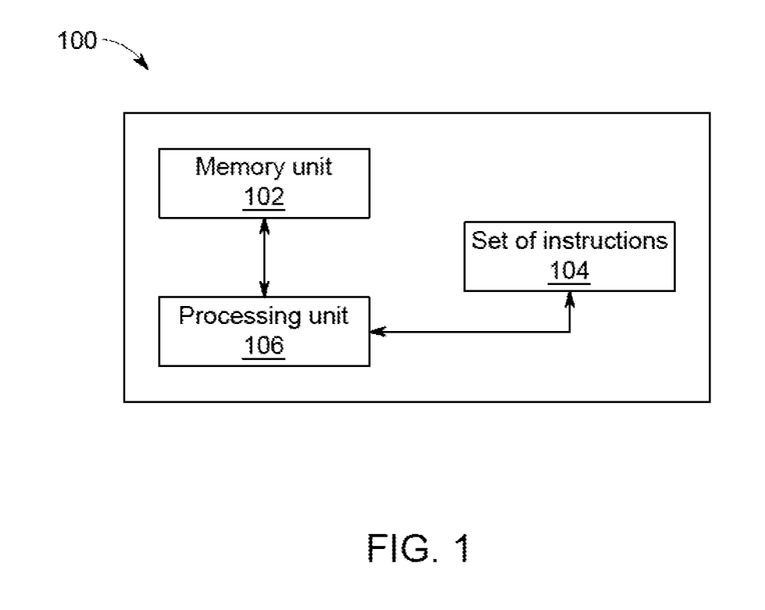
FIG. 1 illustrates a block diagram of a system for reading contents from a document.

FIG. 1 illustrates a block diagram of a system for reading contents from a document. The system 100 includes a memory unit 102 for storing a set of instructions 104, and a processing unit 106 is coupled to the memory unit 102 for processing the set of instructions 104.

The set of instructions 104 are programmed to perform reading of the contents from the document. The step of instructions 104 are hereinafter used as method 104 interchangeably and are explained in detailed in conjunction with FIG. 2 to FIG. 7 of the present invention. Hereinafter in the detailed description of drawings, the set of instructions 104 are also termed as a method 104.

Figure 2:
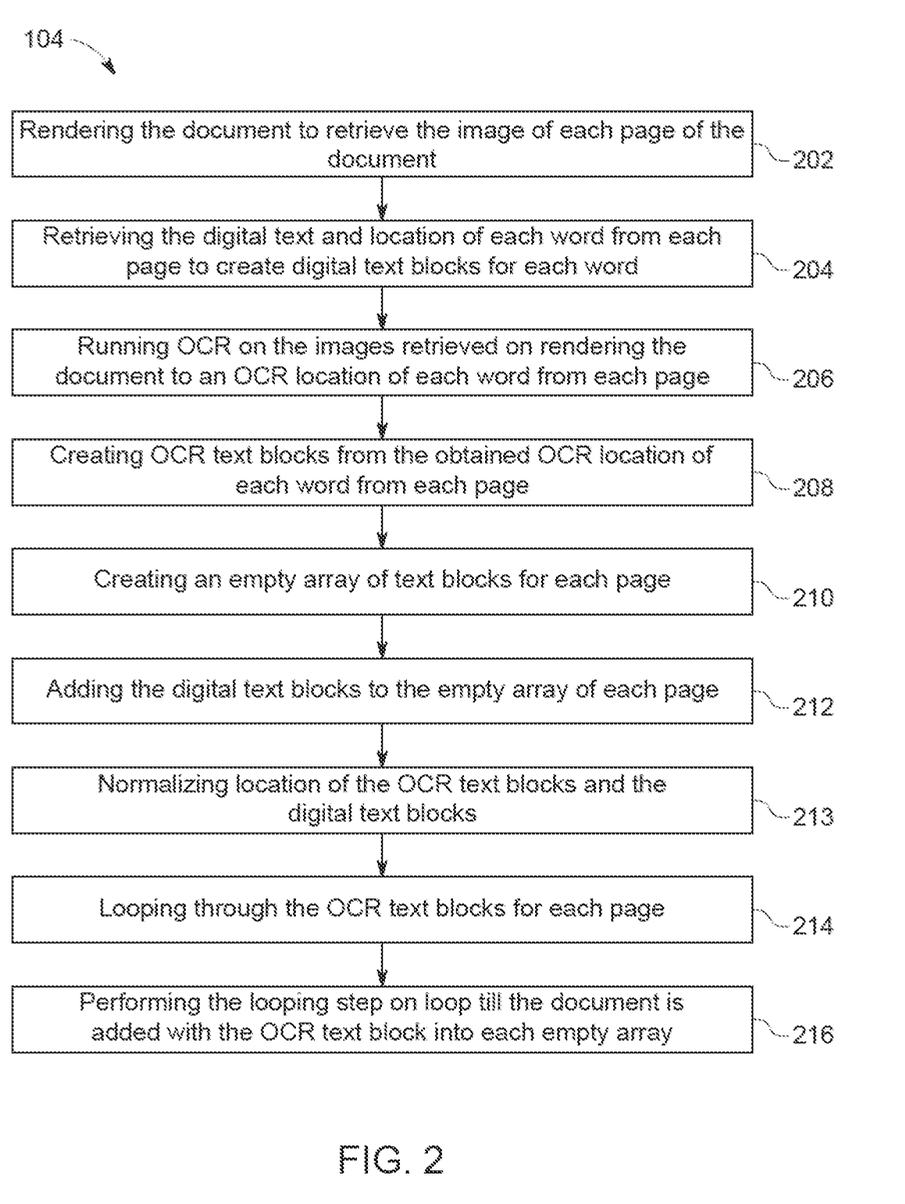
FIG. 2 illustrates a flow chart for showing a method for reading contents from a document in accordance with an embodiment of the present invention

FIG. 2 illustrates a flow chart for showing the method 104 for reading contents from a document in accordance with an embodiment of the present invention. The step of instructions 104 initiate from a step 202 of rendering the document to retrieve the image of each page of the document. The rendering of document is show and explained in detailed in conjunction with FIG. 3 of the present invention.

The step 202 is then followed by a step 204 of retrieving the digital text and location of each word from each page to create digital text blocks for each word. The retrieving of the digital text and location is explained in detail in conjunction with FIG. 4 of the present invention.

The step 204 is then followed by a step 206 of running OCR on the images retrieved on rendering the document to an OCR location of each word from each page. The running of OCR on the images retrieved on rendering the document is explained in detail in conjunction with FIG. 5 of the present invention. The step 206 is then followed by a step 208 of creating OCR text blocks from the obtained OCR location of each word from each page.

The step 208 is then followed by a step 210 of creating an empty array of text blocks for each page. The empty array represents text blocks for receiving digital text blocks. The empty arrays are created for each page that is used for holding both OCR and digital text blocks in any order and does not relate to their location on the page. The empty array is simply a container to keep the data in the memory unit. The step 210 is then followed by a step 212 of adding digital text blocks to the empty array of each page. The step 212 is explained in detail in conjunction with FIG. 6 of the present invention.

The step 212 is then followed by a step 213 for normalizing the location of OCR text blocks and the digital text blocks. The step 213 is then followed by a step 214 for looping through the OCR text blocks for each page. The looping includes a step of confirming the location of the OCR text blocks does not intersection with the location of digital text blocks; and adding a single OCR text block to the corresponding empty array on confirming the location. The confirming of the location is explained in detail in conjunction with FIG. 7 of the present invention.

The method 104 is concluded with the step 216 of performing the looping step on loop till the document is added with the OCR text block into each empty array. In another embodiment of the present invention, the method 104 includes a step of confirming the location of the digital text blocks intersecting with the location of the OCR text blocks, which is followed by a step of replacing one OCR text block with the digital text block.

Figure 3:
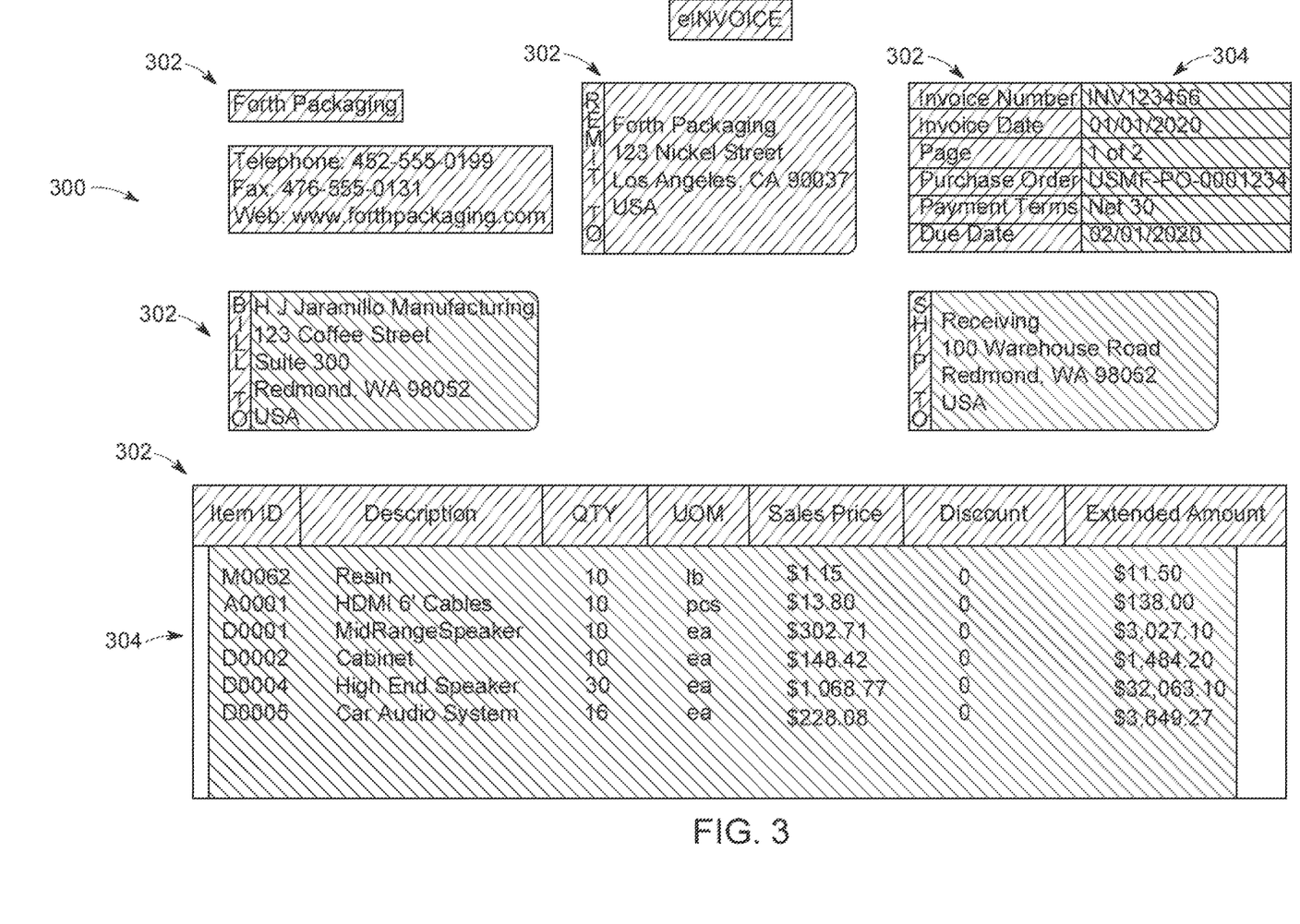
FIG. 3 illustrates a screenshot showing of an exemplary document.

FIG. 3 illustrates a screenshot showing of a document 300 in accordance with an exemplary embodiment of the present invention. The document 300 is an eINVOICE PDF document. It would be readily apparent to those skilled in the art that various type of PDF document may be envisioned for reading the content without deviating from the scope of the present invention.

The document 300 contains both images 302 and digital text 304. Example of the content in the image 302 include but not limited to 'Forth Packaging, Telephone: 452-555-0190, FAX: 476-555-0131', 'Remit To: Forth Packaging, 123 Nickel Street, Los Angeles, Calif. 90037 USA', 'BILL To' and 'SHIP TO', 'invoice number, invoice date, page, purchase order, payment terms, due date', and 'Item ID, Description, Qty, UOM, Sales Price, Discount and Extended Amount.

Examples of content in the digital text 304 include but not limited to 'H Laram ILO Manufacturing, 123 Coffee Street, Suite 300, Redmond, Wash. 98052, USA', Receiving 100 Warehouse Road, Redmond, Wash. 98052, USA, 'MOOG2, Resin, 10, $1.15, 0, $11.50. It would be readily apparent to those skilled in the art that various type of image and text may be envisioned without deviating from the scope of the present invention.

In an embodiment of the present invention, some text may be part of the images and as such is not available in the embedded text layer. The OCR process is used on those images to obtain the OCR text. Hereinafter throughout the specification in FIG. 3 to FIGS. 7—'/ hatching' represents the OCR text, and '\hatching' represents the digital text.

Figure 4:
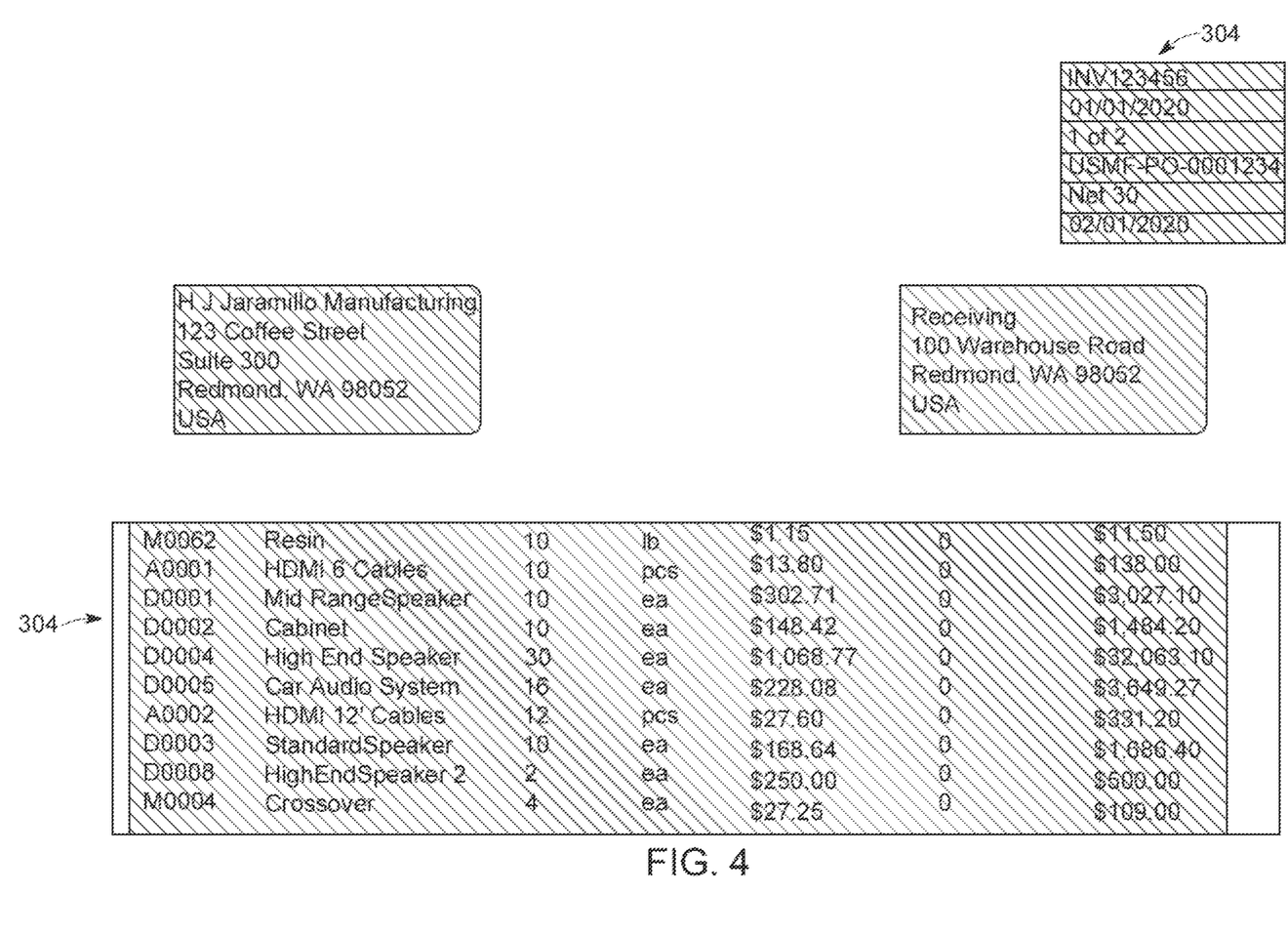
FIG. 4 illustrates a screenshot showing of the document with retrieved digital text.

FIG. 4 illustrates a screenshot showing of the document with retrieved digital text. Only the digital text 304 is extracted from the complete document. Examples of the digital text 304 is explained in detail in conjunction with FIG. 3 of the present invention. The location of each word is also retrieved from each page in the document to create digital text blocks for each word. It would be readily apparent to those skilled in the art that various variation/method for retrieving the digital text blocks may be envisioned without deviating from the scope of the present invention.

For exemplary purposes, the digital text does not include the label invoice number (shown in FIG. 3), whereas the OCR text does. Hence, any text that is a part of the digital document's image is not included in the digital text layer. The digital text blocks are then added to the empty array in any implicit order.

Figure 5:
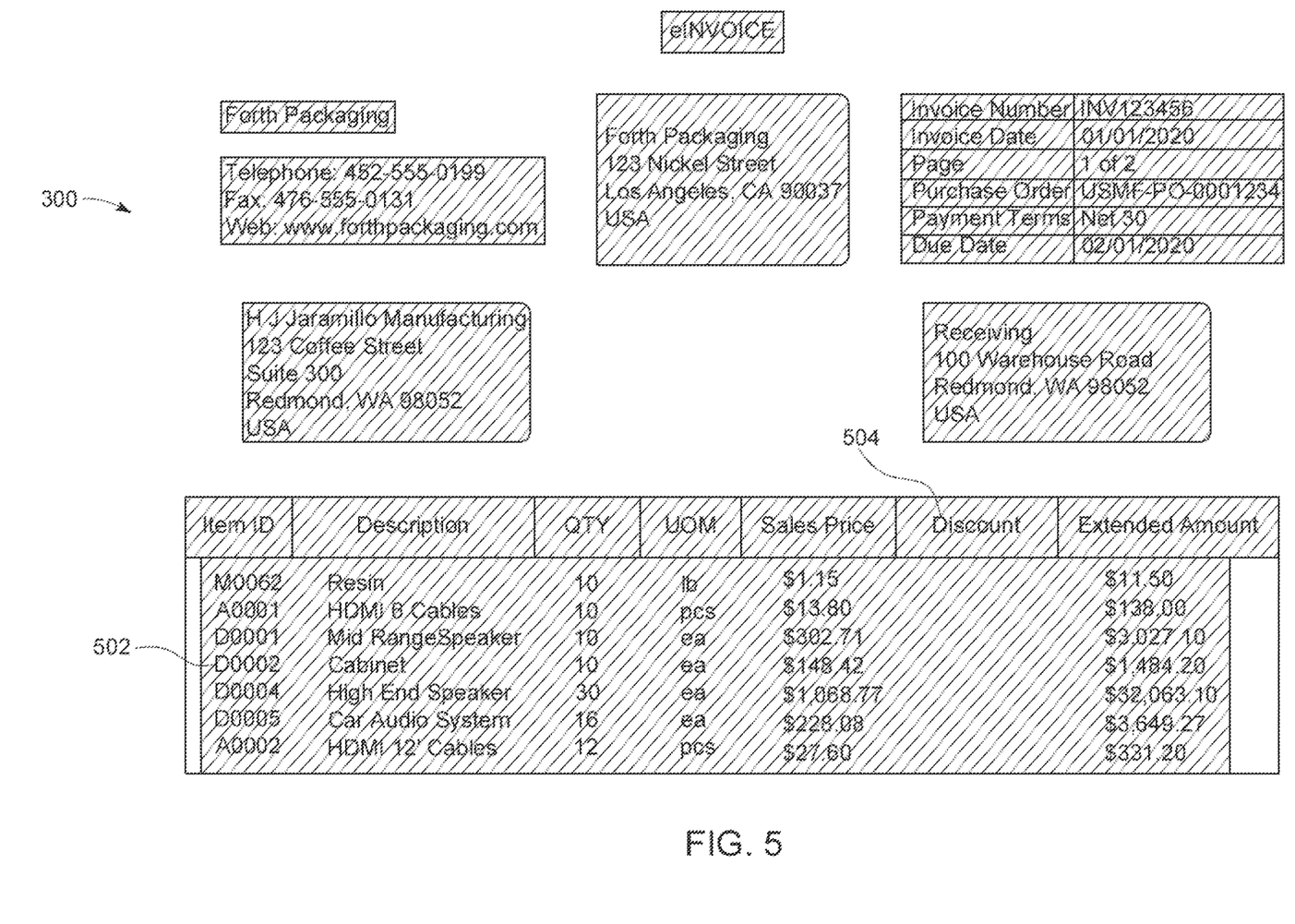
FIG. 5 illustrates a screenshot showing of the document having OCR location.

FIG. 5 illustrates a screenshot showing of the document having OCR location. The OCR process is run on the rendered image of each page to get the OCR text and location of each word. The OCR process includes the text that was present in the digital text layer as well as the text that was present in the document's embedded images.

For exemplary purposes as shown in FIG. 5, 'DOO002' 502 is incorrectly captured by the OCR process where it should be 'D0002' (shown in FIG. 3 & FIG. 6), and the values of the discount 504 is missing. The system then automatically excludes the incorrect 'DOO002' value from OCR and correct value is used from the digital text layer, the same has been shown and explained in detail in conjunction with FIG. 6 of the present invention.

Figure 6:
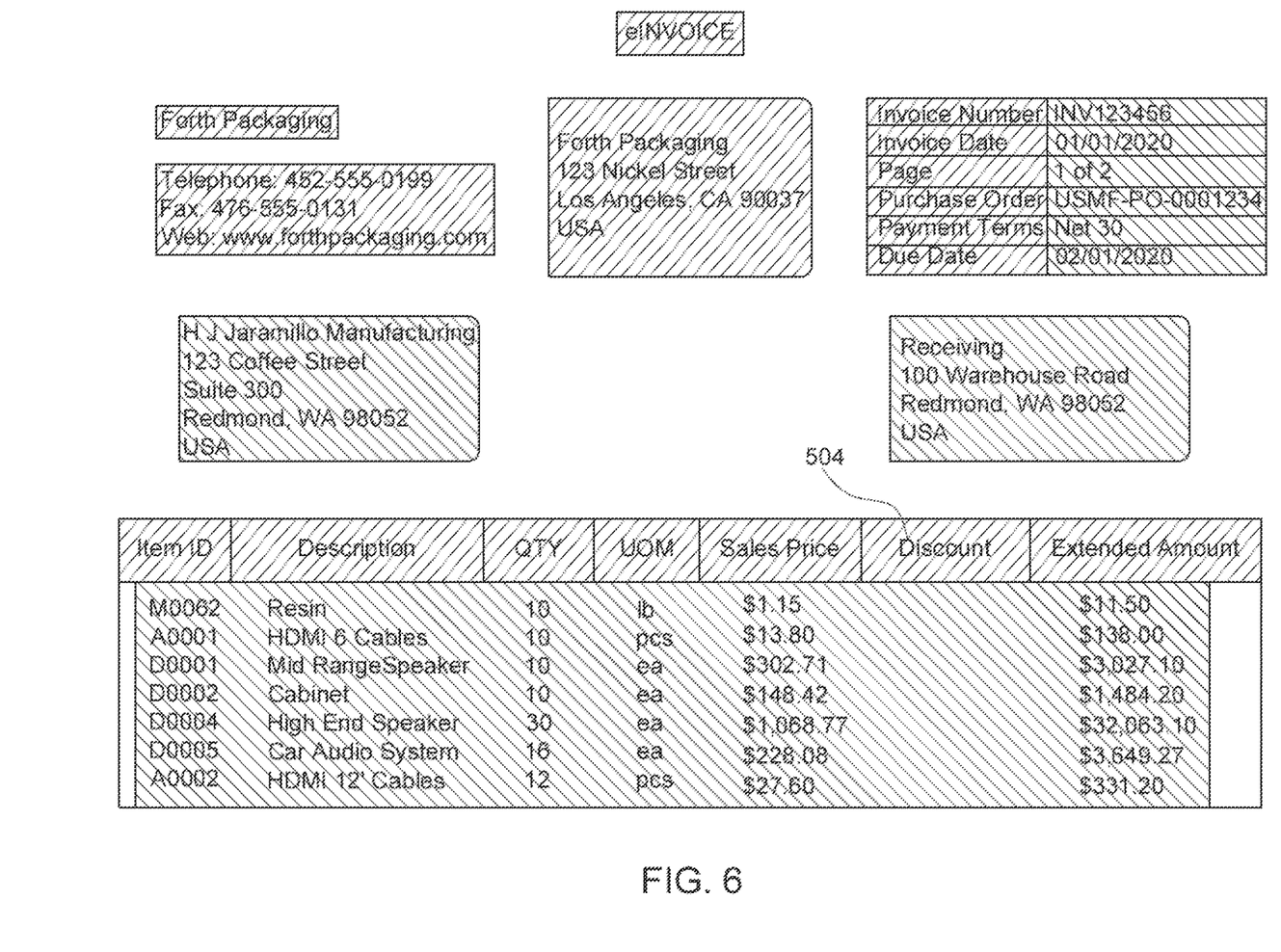
FIG. 6 illustrates a schematic diagram for showing looping through the OCR text blocks of each page.

FIG. 6 illustrates a schematic diagram for showing looping through the OCR text blocks for each page. The digital text and OCR text layers are combined to create a new text layer comprising of both digital and OCR text blocks.

When the OCR text block exists at a location that does not intersect with a digital text block then the OCR text block is added to the new text layer, otherwise if the OCR text block does intersect with a digital text block, then the OCR text block is discarded.

In an embodiment, the digital text does not include the label "Invoice Number" whereas the OCR text does, therefore the system includes the OCR text for "Invoice Number" and include the digital text for "INV123456", conversely the incorrect "DOO002" value from OCR is excluded and the correct value of "D0002" from the digital text layer is used instead.

Similarly, the text missing from the OCR text layer under the category Discount 504 is included from the digital text layer. The process is repeated for each and every text block, till the whole content in the document is read and retrieved. The OCR text layer is showcase via shading and the digital text is showcase in plain numbers/alphabets.

The location of the OCR text blocks and the digital text blocks are normalized to convert the different units of measure into a common unit. For instance, digital text block location may use inches as the measurement and OCR text blocks will use pixels as the measurement to identify the location of the bounding box.

The system uses the width and the height of the document to convert the inch measurements into percentile values, and we use the width and height of the image to convert the pixel measurements into percentile values. The locations from both the digital document and the rendered images are normalized into percentile values so the locations are compared and the intersections are calculated.

It would be readily apparent to those skilled in the art that various methods for normalizing the digital text blocks and OCR text blocks may be envisioned without deviating from the scope of the present invention.

Figure 7:
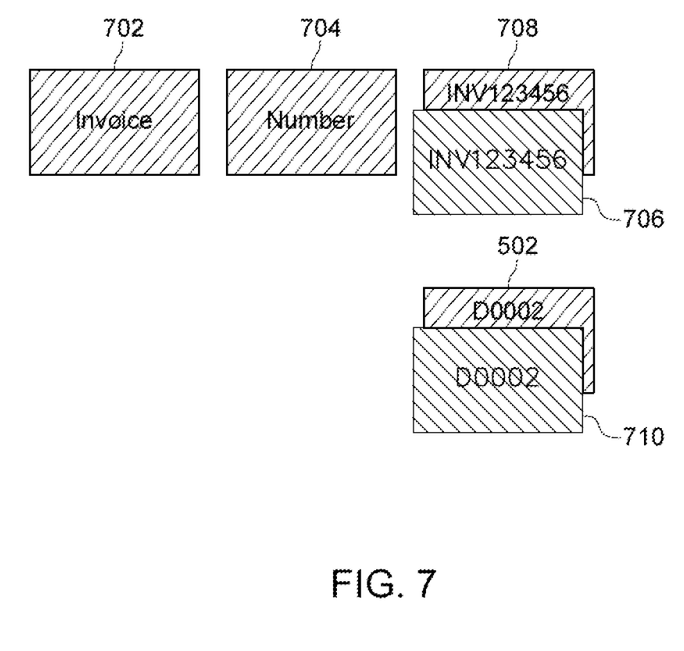
FIG. 7 illustrates a block diagram for confirming the intersection between the OCR text blocks and the digital text blocks.

FIG. 7 illustrates a block diagram for confirming the intersection between the OCR text blocks and the digital blocks. In an exemplary embodiment, the OCR text blocks like Invoice 702, and Number 704 does not intersect with any digital text blocks. Thus, OCR text blocks that are not intersecting are added to the empty array to fill in the missing data.

Further, as shown in FIG. 7, the digital text layer 'INV123456' 706 does intersects with the OCR text layer 'INV123456' 708. In such instances, the system automatically picks up the digital text blocks and discards the OCR text blocks. Similarly, the process is followed for each and every OCR text blocks intersecting with the digital text blocks.

In another exemplary embodiment in continuation to FIG. 5, the OCR text block wrongly identifies 'DOO002' 502, which is then replaced by the digital text block D0002 710. As the digital text block D0002 710 intersects at the location of the OCR text block, thus the system automatically selects the digital text block to attain more accuracy in reading of the contents of the document. The OCR text and the digital text are highlighted with a background color on retrieving the document.

In another preferred embodiment of the present invention, the system and the method is able to determine which text block to be chosen when there is an intersection using weighing of the digital text block and the OCR block. Through the process of weighing text blocks the system and the method further determines if the digital text block or the OCR text block should be used should they intersect with each other rather than prioritizing only digital text blocks.

In an exemplary embodiment, the digital text block is corrupted with symbols such as "■ ■ ■ ■ ■ ■" while the intersecting OCR text block may have a high recognition confidence with a sensible character set such as "Invoice". The weighing mechanism having a set of pre-defined rules or scoring system to determine which text block should be chosen in the given context.

Further, this process may also include a contextual data for instance if there are a range of valid expected values then the text block that matches a valid value may score higher and be chosen over the alternate text block which does not match a valid value.

In another exemplary embodiment, the system and the method is able to determine the preference based on the type of value, for instance numeric values often have more recognition errors in OCR where they are mixed with non-numeric characters such as "D0001" which may be recognized as "DOO001". In this case it is known that 0 and O are difficult to distinguish between, along with other characters such as 8 and 3, in these cases it may prove more accurate to use the digital text block instead as it is more likely to be accurate.

The present invention offers various advantages such as providing a system which is very efficient in reading digital text and images from the documents. The present invention has an impeccable accuracy when extracting the contents of the documents as it favors digital text over OCR text, and avoids missing key data. The present invention is able to assist in reading documents universally but it has certainly increased the accuracy for reading billing, invoicing and remittance documents automatically.

It should be appreciated that many of the elements discussed in this specification may be implemented in a hardware circuit(s), a circuitry executing software code or instructions which are encoded within computer readable media accessible to the circuitry, or a combination of a hardware circuit(s) and a circuitry or control block of an integrated circuit executing machine readable code encoded within a computer readable media. As such, the term circuit, module, server, application, or other equivalent description of an element as used throughout this specification is, unless otherwise indicated, intended to encompass a hardware circuit (whether discrete elements or an integrated circuit block), a circuitry or control block executing code encoded in a computer readable media, or a combination of a hardware circuit(s) and a circuitry and/or control block executing such code.

All ranges and ratio limits disclosed in the specification and claims may be combined in any manner. Unless specifically stated otherwise, references to "a," "an," and/or "the" may include one or more than one, and that reference to an item in the singular may also include the item in the plural.

Although the inventions have been shown and described with respect to a certain embodiment or embodiments, equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the inventions. In addition, while a particular feature of the inventions may have been described above with respect to only one or more of several illustrated embodiments, such feature may be combined with one or more other features of the other embodiments, as may be desired and advantageous for any given or particular application.

The invention claimed is:

1. A system for reading contents from a document having a combination of a page image and a digital text, the system comprising:
   a memory unit for storing a set of instructions; and
   a processing unit coupled to the memory unit for processing the set of instruction, wherein the set of instructions comprises:
   retrieving the page image of each page of the document and rendering the page image into images;
   retrieving the digital text and location of each word from each page creating digital text blocks for each word;
   running OCR on the images retrieved on rendering the document to an OCR location of each word from each page;
   creating OCR text blocks from the OCR location of each word from each page;
   creating an array of digital text blocks for each page where said array is empty;
   adding the digital text blocks to the array of the digital text blocks for each page;
   normalizing a location of the OCR text blocks and the digital text blocks;
   looping through the OCR text blocks for each page, wherein the looping comprises:
   adding a single OCR text block to the array when there are no digital text blocks at the location of the single OCR text block; and
   performing the loop till the document is added with the OCR text block into each array.

2. The system of claim 1, wherein the set of instructions further comprising a step of weighing the digital text blocks.

3. The system of claim 1 wherein the digital text is highlighted with a background color on retrieving the document.

4. The system of claim 1 wherein the OCR text is highlighted with a background color on retrieving the document.

5. A system for reading contents from a document having a combination of a page image and a digital text, the system comprising:
   a memory unit for storing a set of instructions; and
   a processing unit coupled to the memory unit for processing the set of instructions, wherein the set of instructions is programmed to:
   retrieve the page image of each page of the document and render the page image into images;
   retrieve the digital text and location of each word from each page and create digital text blocks for each word;
   run OCR on the images retrieved after the document is rendered, to find a location of each word from each page;
   create OCR text blocks from the OCR location of each word from each page;
   create an array of the digital text blocks for each page where said array is empty;
   add the OCR text blocks to the array of the digital text blocks for each page;
   normalize a location of the digital text blocks;
   loop through the digital text blocks for each page, wherein the loop is programmed to:
   replace one OCR text block with the digital text block when the digital text block is at the location as the one OCR text block; and
   perform the loop until the document is added with the digital text blocks into each array.

6. The system of claim 5, wherein the set of instructions is further programmed to weigh the digital text blocks.

7. The system of claim 5 wherein the digital text is highlighted with a background color on retrieving the document.

8. The system of claim 5 wherein the OCR text is highlighted with a background color when the document is retrieved.

9. A non-transitory computer-readable medium having stored thereon computer-readable instructions that, when executed by a processing unit, cause the processing unit to execute a method for reading contents from a document, the method comprising:
   retrieving a page image of each page of the document;
   rendering the page image into images;
   retrieving digital text and location of each word from each page creating digital text blocks for each word;
   running OCR on the images retrieved on rendering the document to an OCR location of each word from each page;
   creating OCR text blocks from the OCR location of each word from each page;
   creating an array of the digital text blocks for each page where said array is empty;
   adding the digital text blocks to the array of the digital text blocks for each page;
   normalizing a location of the OCR text blocks and the digital text blocks;
   looping through the OCR text blocks for each page, wherein the looping comprises:
   adding a single OCR text block to the array when there are no digital text blocks at the location of the single OCR text block; and
   performing the loop till the document is added with the OCR text block into each empty array.

10. The method of claim 9 further comprising a step of weighing the digital text blocks.

11. The method of claim 9 wherein the digital text is highlighted with a background color on retrieving the document.

12. The method of claim 9 wherein the OCR text is highlighted with a background color on retrieving the document.

* * * * *